United States Patent
LeBoeuf et al.

(10) Patent No.: US 7,580,440 B2
(45) Date of Patent: Aug. 25, 2009

(54) SYSTEM FOR EMISSION OF ELECTROMAGNETIC RADIATION, AND METHOD FOR MAKING

(75) Inventors: Steven Francis LeBoeuf, Schenectady, NY (US); Radislav Alexandrovich Potyrailo, Niskayuna, NY (US); William Hullinger Huber, Scotia, NY (US); Rui Chen, Niskayuna, NY (US); Todd Ryan Tolliver, Clifton Park, NY (US); Alexei Vasilievich Vertiatchikh, Niskayuna, NY (US)

(73) Assignee: GE Homeland Protection, Inc., Newark, CA (US)

( * ) Notice: Subject to any disclaimer, the term of this patent is extended or adjusted under 35 U.S.C. 154(b) by 527 days.

(21) Appl. No.: 11/260,415

(22) Filed: Oct. 27, 2005

(65) Prior Publication Data

US 2007/0098029 A1    May 3, 2007

Related U.S. Application Data

(60) Provisional application No. 60/727,914, filed on Oct. 14, 2005.

(51) Int. Cl.
*H01S 3/09* (2006.01)
(52) U.S. Cl. .............................. 372/74; 372/69; 372/73
(58) Field of Classification Search .................. 372/69, 372/73–74
See application file for complete search history.

(56) References Cited

U.S. PATENT DOCUMENTS

| | | | | |
|---|---|---|---|---|
| 5,807,764 | A * | 9/1998 | Rice et al. ...................... 438/29 |
| 2001/0033589 | A1 * | 10/2001 | Pankove ...................... 372/43 |
| 2002/0145774 | A1 * | 10/2002 | Sherman ...................... 359/109 |
| 2004/0048409 | A1 * | 3/2004 | Biwa et al. ...................... 438/46 |
| 2005/0110386 | A1 * | 5/2005 | Tiberi et al. .................. 313/446 |
| 2006/0163998 | A1 * | 7/2006 | Tiberi et al. ............. 313/477 R |
| 2007/0114566 | A1 * | 5/2007 | Maruska et al. ............. 257/190 |

OTHER PUBLICATIONS

C. E. Hurwitz, "High-Power and Efficiency in CdS Electron Beam Pumped Lasers", Applied Physics Letters, vol. 9, No. 12, pp. 420-423, Dec. 15, 1966.

V. Daneu et al., "Electron-Pumped High-Efficiency Semiconductor Laser", Applied Physics Letters, vol. 49, No. 10, pp. 546-548, Sep. 8, 1986.

J. F. Asmus et al., "Pulse Broadening in a MHD Copper Vapor Laser", Applied Physics Letters, vol. 13, No. 11, pp. 384-385, Dec. 1, 1968.

(Continued)

*Primary Examiner*—Minsun Harvey
*Assistant Examiner*—Phillip Nguyen
(74) *Attorney, Agent, or Firm*—Joseph J. Christian

(57) ABSTRACT

A device for emission of electromagnetic radiation comprises a source of atomic particles and a collector disposed to receive atomic particles from the source. The collector comprises an emission medium, the medium comprising a crystal having a spatial dimension in the range from about 10 nanometers to about 50 micrometers, wherein the emission medium has the capability to generate opposing charge pairs upon absorption of atomic particles from the source and to emit electromagnetic radiation upon recombination of the pairs. The emission may be via spontaneous emission or, in certain embodiments, by stimulated emission. A laser assembly comprising this device, and methods for making the device are also presented herein.

45 Claims, 4 Drawing Sheets

OTHER PUBLICATIONS

J. L. Brewster, "Stimulated Emission From CdS At ultra-High Current Density Electron Beam Pumping", Applied Physics Letters, vol. 13, No. 11, pp. 385-387, Dec. 1, 1968.

H. Klausing et al., "Electron Beam Pumping in Nitride Vertical Cavities With GaN/Al$_{0.25}$, Ga$_{0.75}$ N Bragg Reflectors", Laboratorium fur Informationstechnologie, Universitat Hannover, 30167 Hannover, Germany., Abstract.

S. Bidnyk et al., "Room Temperature Laser Action in Laterally Overgrown GaN Pyramids on (111) Silicon", Center for Laser and Photonics Research and Department of Physicx, Oklahoma State University, Stillwater, Oklahoma 74078, Cite the article as: MRS Internet j. Nitride Semicond. Res. 4S1, G6.48, 1999.

H. X. Jiang et al., "Optical Resonance Modes in GaN Pyramid Microcavities", Applied Physics Letters, vol. 75, No. 6, pp. 763-765, Aug. 9, 1999.

* cited by examiner

SYSTEM FOR EMISSION OF ELECTROMAGNETIC RADIATION, AND METHOD FOR MAKING

CROSS REFERENCE TO RELATED APPLICATIONS

This application claims the benefit of, and priority to, U.S. Provisional Application No. 60/727,914, filed Oct. 14, 2005, entitled "SYSTEM FOR EMISSION OF ELECTROMAGNETIC RADIATION, AND METHOD FOR MAKING," which provisional application is hereby incorporated by reference in its entirety.

BACKGROUND

This invention relates to devices for emitting electromagnetic radiation. More particularly, this invention relates to such devices comprising nanocrystalline emissions media, and methods for making such devices. This invention also relates to systems incorporating such devices.

Lasers, and other systems for producing electromagnetic radiation, have found uses in a host of applications, and continue to be a topic of considerable interest. For example, recent progress in the area of III-V semiconductor laser diodes operating in the blue-green to ultraviolet (UV) spectral range has sparked interest in such applications as optical storage technology, laser cathode ray tubes, UV light sources for high-precision lithography, and others. However, the development of such systems has been hampered somewhat by certain technological obstacles. The fabrication of laser cavities suitable for use in these systems can be prohibitively expensive due to the materials of construction and the exacting specifications required to produce a cavity having the optical properties necessary to produce an efficient laser. Moreover, lasers tend to be very limited in available range of wavelength emitted by a given device. Therefore, what is needed is a device for producing electromagnetic radiation, such as laser radiation, that requires less costly processes for fabrication and that provides flexibility in available wavelength emission.

BRIEF DESCRIPTION

Embodiments of the present invention meet these and other needs. One embodiment is a device for emission of electromagnetic radiation. The device comprises a source of atomic particles and a collector disposed to receive atomic particles from the source. The collector comprises an emission medium, the medium comprising a crystal having a spatial dimension in the range from about 10 nanometers to about 50 micrometers, wherein the emission medium has the capability to generate opposing charge pairs upon absorption of atomic particles from the source and to emit electromagnetic radiation upon recombination of the pairs. The emission may be via spontaneous emission or, in certain embodiments, by stimulated emission.

Another embodiment is a laser assembly. The laser assembly comprises a chamber comprising a window substantially transparent to electromagnetic radiation having a wavelength in the range from about 50 nanometers to about 10 micrometers, the chamber configured to contain a partial vacuum; and the laser emission device, disposed within the chamber and configured to emit laser radiation through the window. The laser radiation has a wavelength in the range from about 50 nanometers to about 10 micrometers, and the laser emission device comprises the device described above.

Another embodiment is a method for making a device for emission of electromagnetic radiation. The method comprises providing a source of atomic particles; providing a collector comprising an emission medium; and disposing the collector to receive atomic particles from the source. The medium comprises a crystal having a spatial dimension in the range from about 10 nanometers to about 50 micrometers, and has the capability to generate opposing charge pairs upon absorption of atomic particles from the source and to emit electromagnetic radiation upon recombination of the pairs.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
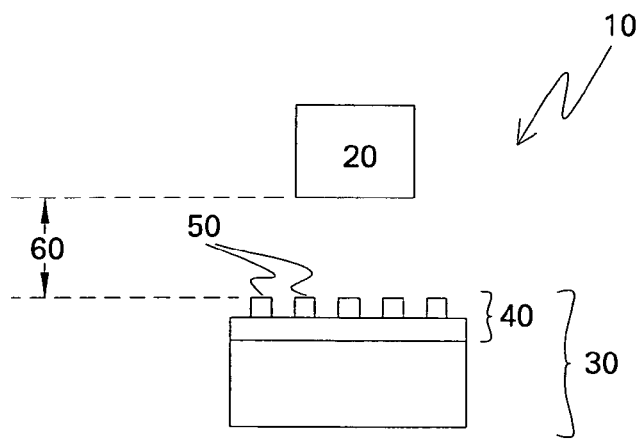
FIG. 1 is a schematic representation of an exemplary device of the present invention.

FIG. 1 illustrates a device 10 for emission of electromagnetic radiation in accordance with one embodiment of the present invention. Device 10 comprises a source 20 of atomic particles and a collector 30 disposed to receive atomic particles from source 20. Collector 30 comprises an emission medium 40. Atomic particles from source 20 are received by collector 30 and absorbed by emission medium 40, and the resultant transfer of energy causes electromagnetic radiation to be emitted from medium 40. Specifically, the electromagnetic radiation referred to herein is that radiation emitted because medium 40 has the capability to generate opposing charge pairs, such as electron-hole pairs or electron-ion pairs, upon absorption of atomic particles from source 20, and to emit electromagnetic radiation upon recombination of these pairs. The emission due to recombination may be via spontaneous emission, or, in particular embodiments, the emission is by stimulated emission, as described in more detail, below.

Source 20 may be a source of, for example, protons, electrons, neutrons, or alpha particles. In particular embodiments, source 20 is a source of electrons, such as, for example, a wire-wound filament emitter (e.g., made of a refractory material such as tungsten), a field emitter, a dispenser cathode, a photo-emitter, or a ferroelectric cathode. Electrons are emitted from source 20 and are received by collector 30 across a gap 60 situated between source 20 and collector 30. Gap 60, in some embodiments, is of sufficient size to support a high electric field between source 20 (which may be referred to as a "cathode") and collector (which may be referred to as an "anode"). Electrons may thus be accelerated across the electric field to impinge upon collector 30 and its emission medium 40. The voltage used to create the field is typically in the range from about 1 kilovolt (kV) to about 10 kV.

Emission medium 40 comprises material having special opto-electronic properties. As described above, medium 40 is capable of forming opposing charge pairs (electron-hole pairs or electron-ion pairs) in response to the energy it absorbs from the atomic particles received from source 20. Moreover, these pairs recombine and photons (electromagnetic energy) are emitted as part of the recombination process. The speed at which these pairs recombine determines in part the mechanism of photon emission induced in the material. Where the recombination occurs very quickly (i.e., on the order of tens of nanoseconds), the emission is generally achieved via spontaneous emission. However, in some materials the recombination is delayed due to the existence of metastable equilibrium electron energy states in the material, thus creating an opportunity for emission to occur via stimulated emission mechanism, where a first photon stimulates emission of another photon of the same phase, wavelength, and direction. In certain embodiments, source 20 serves to create opposing charge pairs faster than they can recombine, thereby "pumping" emission medium 40 into a state known to the art as a "population inversion," where the number of opposing charge pairs in the material exceeds that found in the same material under thermodynamic equilibrium conditions.

The capability of the material making up emission medium 40 to maintain a population inversion is necessary, but not sufficient, to sustain stimulated emission in the system. Laser devices further require an optical resonant cavity, also referred to herein as an "optical resonator," to promote stimulated emission of radiation in a particular direction and to enhance the number of stimulated emission events via optical feedback. Generally this is accomplished by confining the emission medium between two reflective surfaces, such as mirrors, where, usually, one surface is completely reflective and the other surface is partially reflective. Photons emitted in the direction promoted by the mirrors (the "optical axis") pass back and forth within the medium, thereby further stimulating emission as they go, whereas photons emitted in other directions are lost. When the number of photons produced by stimulated emission exceeds that produced spontaneously, the system can "lase," that is, produce a highly directional, coherent beam of electromagnetic radiation that passes through the partially reflective mirror and provides useful optical power.

Figure 2:
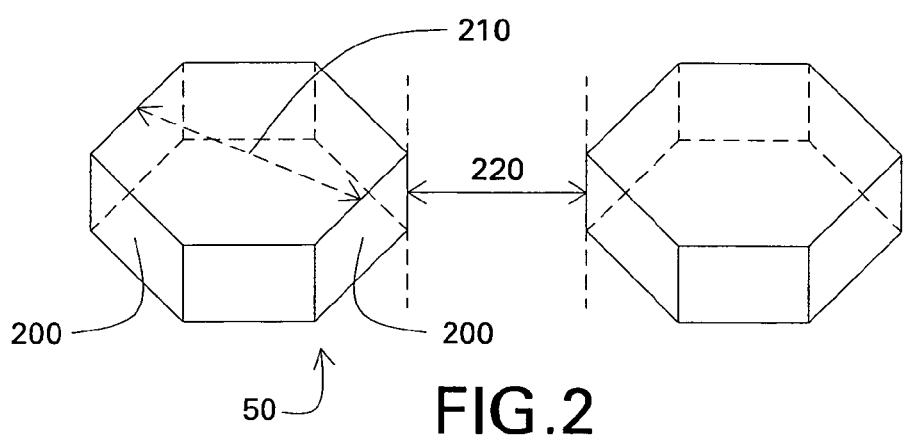
FIG. 2 is a representation of an exemplary crystal.

In some conventional laser systems, such as those using films of semiconductor materials such as gallium nitride or aluminum gallium nitride as emissions media, forming the optical resonant cavity can be very expensive and labor intensive. Embodiments of the present invention address this concern by avoiding the need for such costly processing. Emission medium 40 comprises a (that is, at least one) crystal 50 having a spatial dimension in the range from about 10 nanometers to about 50 micrometers. In some embodiments, emission medium 40 is a medium capable of producing stimulated emission as described above. In these embodiments, crystal 50 comprises external plane faces, also referred to herein as facets 200 (FIG. 2), that define an optical resonator 210 having a dimension in the range from about 10 nanometers to about 50 micrometers. In particular embodiments, the range is from about 100 nanometers to about 1000 nanometers. The size of resonator 210 in part determines the wavelength of the radiation emitted. Resonator 210 size is generally selected to be somewhere in the range from about 0.5 times the desired wavelength to about 100 times the wavelength, to support resonance of the radiation in the desired modes.

As used herein, the term "crystal" means a body that is formed by the solidification of a chemical element, a compound, or a mixture, has a regularly repeating internal arrangement of its atoms, and is bound by external plane faces (facets). In particular embodiments, the external plane faces of the crystal employed in embodiments of the present invention are the faces formed naturally upon growing the crystal, in contrast to faces formed by cleaving as-grown crystals. In such cases the orientation of the facets is in accordance with the crystal lattice of the medium material. Use of the naturally formed facets, rather than cleaved faces, provides certain advantages. For example, the naturally formed crystal facets tend to be extremely smooth, with roughness often less than about 10 nanometers, while cleaved faces are generally not as smooth. Moreover, cleaved faces are often marred by such artifacts of the cleaving process as steps, cracks, and chips. As a result, naturally formed facets may be more efficient reflectors of electromagnetic radiation than cleaved faces. Finally, "crystal" as used herein refers to an individual, single-crystalline structure, in contrast to a crystallite, "grain," or other structure disposed in a solid polycrystalline continuum.

Crystal 50 is not limited in any way to particular crystal lattice structures. Examples of crystal lattice structures include, but are not limited to, hexagonal close packed, cubic, face centered cubic, body centered cubic, diamond cubic, wurtzite structure, and zincblende structure. In particular embodiments, crystal 50 is an epitaxially grown crystal, meaning that its crystal structure mimics that of the substrate on which it was grown. Crystal 50 may be attached to its growth substrate or, in some embodiments, may be a free-standing structure. Crystal 50 comprises doped material in some embodiments. Many materials, such as certain semiconductors and scintillator materials, owe their luminescent properties to the presence of dopants. Thus, where any particular class or species of material is described herein as acceptable for use in crystal 50, it will be understood that the description includes doped compositions. Moreover, crystal 50 may be any shape, including shapes having some sides that are substantially parallel, as in prismatic shapes; and further including shapes having no parallel sides, such as pyramids. Though pyramids have non-parallel faces, resonance has been demonstrated to occur between multiple, non-parallel faces. Thus, using pyramids, where faces are off-parallel by, for instance, approximately 30 degrees, allows light extraction from the top of the crystal 50 as opposed to the sides. This can help couple light out of the crystals and into the surrounding air, vacuum, or other medium.

In some embodiments, emission medium 40 further comprises a potential well disposed within or upon crystal 50. Potential wells create additional metastable electron energy states within a material by subjecting electrons and holes to quantum confinement. A potential well disposed within or upon crystal 50 may therefore facilitate stimulated emission of electromagnetic radiation in crystal 50 by decreasing the threshold energy necessary to create a population inversion. Various types of potential wells are known in the art, including quantum wells (which confine in one dimension), quantum wires (which confine in two dimensions), and quantum dots (which confine in three dimensions). As an example, a quantum dot is a semiconductor crystal with a diameter of a few nanometers. Because of its size, a quantum dot has the ability to confine electrons in three dimensions to a region on the order of the electrons' de Broglie wavelength in size, a few nanometers in a semiconductor. Methods for making and depositing nanodots and other potential wells are well known in the art.

In one embodiment, crystal 50 comprises a semiconductor material, and in certain embodiments the material comprises a direct bandgap semiconductor. Direct bandgap semiconductors are typically more efficient producers of photons than indirect bandgap materials, although embodiments of the present invention are not necessarily limited to direct bandgap materials. Examples of direct bandgap semiconductors include the so-called III-V semiconductors, which comprise elements from groups IIIB (e.g., boron, aluminum, gallium, indium) and VB (e.g., phosphorous, arsenic, nitrogen, antimony) of the Periodic Table. Gallium arsenide is a well-known example of a III-V semiconductor. In some embodiments, the semiconductor comprises a nitride, an arsenide, a phosphide, a telluride, an antimide, or combinations of these. In particular embodiments, the semiconductor comprises a nitride having the formula $Al_xIn_yGa_{(1-x-y)}N$; where the sum x+y is less than or equal to 1. This material, which is currently in commercial use in products such as light emitting diodes (LEDs) and high electron mobility transistors (HEMTs), is especially useful because the wavelengths of radiation emitted by the material may be controlled over a wide range (from ultraviolet to infrared) by controlling the composition in known ways.

Although semiconductor materials are especially well-suited for use as the material from which crystal 50 is made, other materials may be suitable. Many materials other than semiconductors are known in the art to emit light via luminescence upon exposure to atomic particles. Scintillator materials, such as rare-earth-doped yttrium aluminum garnet (YAG) and rare-earth-doped yttrium aluminum perovskite (YAP), are an example. Other examples of scintillator materials and other materials suitable for crystal 50 include lithium gallate, aluminum nitride (AlN), boron nitride (BN), diamond, barium fluoride ($BaF_2$), cadmium tungstate ($CdWO_4$), and bismuth germanium oxide (BGO). Further examples include phosphors, such as copper-doped zinc sulfide (ZnS:Cu), cerium-doped yttrium silicate, and others known in the art, including phosphor compositions comprising rare earth elements such as lanthanum.

In some embodiments, the emission medium is capable of emitting, via recombination of opposing charge pairs, electromagnetic radiation having a wavelength in a wavelength range from about 50 nanometers (ultraviolet) to about 10 micrometers (infrared). In certain embodiments, the wavelength range is from about 100 nanometers to about 5 micrometers, and in particular embodiments, the wavelength range is from about 150 nanometers to about 3 micrometers. The wavelength of the radiation emitted by emission medium 40 may be selected by material choice and by selecting the size and shape of crystal 50. The wavelengths of radiation emitted by luminescent materials are determined in large part by their electron energy band structures, which are known or may be readily calculated. Moreover, where resonance plays a role, as it does in stimulated emission, the wavelength is also dependent on the geometry of the crystal. Typically, optical resonators sized to coincide with a whole number of half-wavelengths allow for the greatest optical resonance, and this encourages only key optical modes to resonate and leave the crystal.

In some embodiments, emission medium 40 comprises a plurality of crystals 50, and in certain embodiments each crystal of the plurality has a spatial dimension in the range defined for crystal 50, above. Moreover, in certain instances the plurality of crystals 50 comprises an array of crystals 50, wherein substantially all (that is, over 75%) of the crystals in the array share a common plane. An example of such an arrangement is shown in FIG. 1, wherein each crystal 50 is disposed on a planar medium 40. A planar array is advantageous because the crystals can be pumped evenly by the incident particles from source 20, and optical light extraction can be obtained uniformly throughout the array. In certain embodiments, the array is an ordered array, meaning that the intercrystalline spacing 220 (FIG. 2) is substantially the same for all crystals in the array. In particular embodiments, the plurality of crystals comprises crystals having substantially identical composition, size, and shape. "Substantially the same" and "substantially identical" in this context mean that the variation in spacing, composition, size, or shape is not sufficient to significantly alter the emission properties of the array from that expected for an array having such parameters that are exactly equal for all crystals in the array. The intercrystalline spacing 220 is defined to be the distance between the nearest respective facets of nearest neighbor crystals. In certain embodiments, this spacing is comparable to the size of the crystals; that is, the intercrystalline spacing is a multiple from about 0.5 to about 10 times the radius of gyration of the crystal area projected onto the common plane. In particular embodiments, this multiple is 1.

In certain embodiments, the emission medium 40 has the capability to emit electromagnetic radiation having a plurality of wavelengths. As described above, the wavelength emitted by a particular crystal is a function of crystal composition, size, shape, crystal structure, etc. Because each crystal 50 in the medium 40 is itself an emitter, embodiments of the present invention provide an opportunity to combine multiple wavelengths of emission from a single medium 40 by incorporating crystals 50 of varying properties into the plurality of crystals. Accordingly, in certain embodiments at least one crystal 50 of the plurality substantially differs from another crystal 50 of the plurality in at least one characteristic selected from the group consisting of size, shape, crystal structure, and chemical composition.

Figure 3:
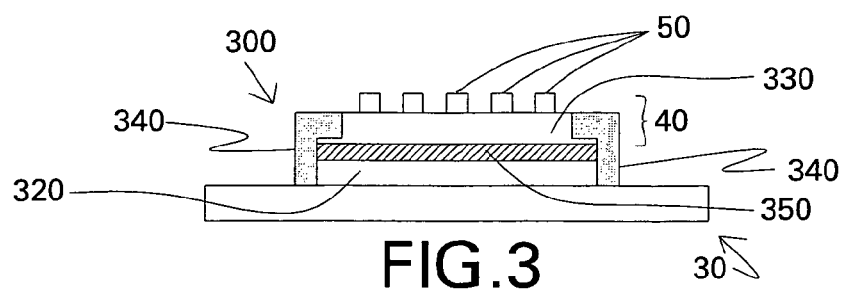
FIG. 3 is a schematic representation of a collector in accordance with embodiments of the present invention.

FIG. 3 illustrates one example of a device in accordance with the present invention. In this exemplary embodiment, collector 30 comprises an emission assembly 300, which in turn comprises emission medium 40 and a substrate 320 upon which emission medium 40 is disposed. Emission medium 40 comprises one or more crystals 50 as described previously. In certain embodiments, emission medium 40 also comprises a crystal support material 330 upon which crystal 50 is disposed. Support material 330 is often, though not necessarily, made of the same material as that of crystal 50. In some embodiments, support material 330 is the very support upon which crystal 50 was grown. Support material 330, often called "the "template layer" in crystal growth processes, often plays a significant role in an epitaxial growth process. For example, a sufficient lattice matching must exist to allow the epitaxial growth of a crystal on an underlying support material. Furthermore, for the case of electron-pumping, it is desirable to have support material 330 be electrically conducting to at least some extent, to minimize heating and to prevent charging effects. For light extraction, a low index of refraction is desirable in support material 330 to prevent optical coupling of light into the support layer and to encourage optical resonance. As an example, for a $Al_{0.15}Ga_{0.85}N$ nanocrystal array, an n-doped $Al_{0.25}Ga_{0.75}N$ epitaxial layer may be a good support material because the support material is substantially lattice-matched to $Al_{0.15}Ga_{0.85}N$, is thermally and electrically conductive, and has a significantly lower index of refraction than the $Al_{0.15}Ga_{0.85}N$ nanocrystal array.

Substrate 320 in certain embodiments comprises an electrically insulating material, such as, for instance, sapphire, quartz, silicon dioxide, silicon nitride, aluminum nitride, or an oxide material. Where substrate 320 is insulating, a conductive path is established between assembly 300 and a conductive portion of collector 30, generally by a metallization pattern 340 disposed via one of the many various techniques known in the art. In alternative embodiments, substrate comprises a material capable of conducting charge, such as a semiconductor or electrically conducting material. One example of a suitable material is silicon, generally doped to enhance its electrical conductivity. The use of non-insulating material for substrate 320 eliminates the need for the metallized pattern 340 to establish a conductive path to the rest of collector 30.

In certain embodiments, regardless of the type of substrate 320 selected, emission assembly 300 further comprises an intermediate layer 350 of material disposed between substrate 320 and the emission medium 40. Intermediate layer 350 serves to mitigate stresses between substrate 320 and medium 40 due to mismatches in coefficient of thermal expansion and lattice mismatch, and further may serve as a more suitable nucleation layer than the substrate layer for nanocrystal growth. In some embodiments, multiple intermediate layers are applied to further promote stress reductions and efficient crystal growth. Examples of materials suitable for use as intermediate layer 350 include, but are not limited to, aluminum nitride, gallium nitride, indium nitride, aluminum indium gallium nitride, silicon, zinc oxide, gallium arsenide, aluminum indium gallium arsenide, lithium gallate, and boron nitride. Intermediate layer 350 may be deposited upon substrate 320, upon medium 40, or both, using any suitable coating method, such as, for example, chemical or physical vapor deposition processes known to those in the art. Typically, intermediate layer 350 has a thickness in the range from about 100 nanometers to about 10,000 nanometers, often about 1000 nanometers.

A method for making a device for emission of electromagnetic radiation includes providing a source of atomic particles 20; providing a collector 30 comprising the emission medium 40 as described above; and disposing collector 30 to receive elemental atomic particles from source 20. Disposing collector 30 generally entails steps commonly known in the art to ensure a device of a particular design is properly positioned and, if necessary, connected via a charge carrying path to circuitry employed to control the device. Moreover, source 20, in some embodiments, is a source selected from any of the suitable examples set forth above.

Providing collector 30 involves methods that are well known in the art for growing crystals in a selective manner on a substrate. Generally, these methods involve rendering selected portions of the substrate unavailable for crystal growth via the selected crystal growth process. An example of this rendering step is applying a patterned mask to the substrate so that only selected areas of the substrate are exposed. The masked substrate is then exposed to a crystal growth process, such as, for example, metallorganic chemical vapor deposition (MO-CVD) such that crystals grow only in the exposed regions of the substrate. In some embodiments, the crystal is grown epitaxially on the substrate, which allows the crystal structure to be controlled in part via proper selection of the substrate. After growth, the mask is removed, leaving behind the substrate with the crystals disposed on the formerly masked surface.

Figure 4:
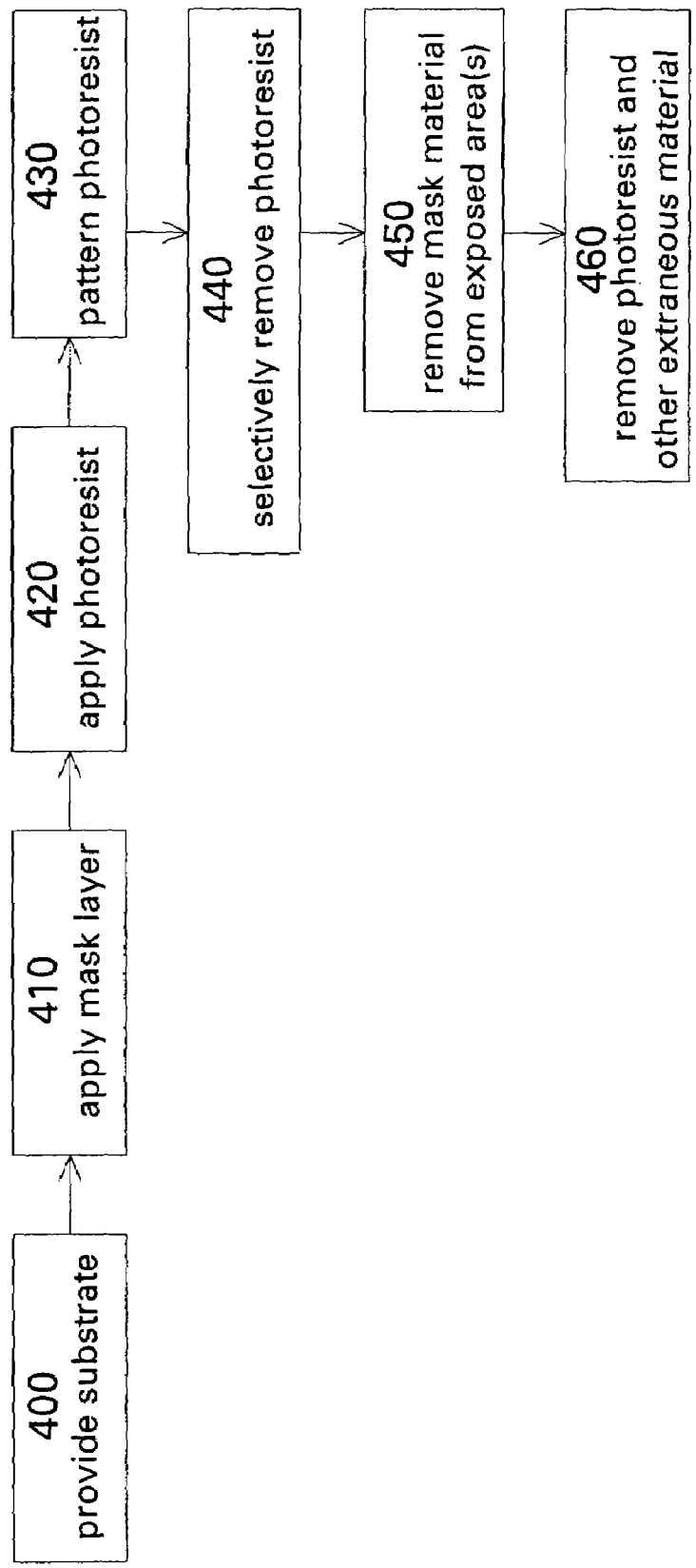
FIG. 4 is a flow diagram representing an exemplary method of the present invention.

FIG. 4 illustrates one exemplary process for providing a patterned mask on the substrate. In the first step 400, a substrate is provided. Suitable examples of the substrate include those described above for the device embodiments. As described above, at least one optional intermediate layer may be deposited on the substrate by any of various methods known in the art, such as sputtering or chemical vapor deposition. A mask material layer is attached in the next step 410. This mask material is used to shield certain areas of the substrate so that no crystal growth will occur in masked regions during subsequent steps. As is known in the art, the mask material should be stable in the environment present during the crystal growth process. Examples of materials often employed for this use include silicon dioxide, silicon nitride, and other oxides, nitrides, and carbides.

In the next step 420, a layer of photoresist is applied. The photoresist is then patterned (step 430) using any of various known techniques. Photolithographic techniques, such as UV lithography, electron beam lithography, contact lithography, etc., are commonly used examples of methods for selectively forming a pattern on the photoresist layer. If needed, a layer of material that is opaque to the radiation used in the lithographic process may be deposited on the substrate prior to depositing the photoresist to ensure that no radiation makes its way through to the potentially sensitive materials making up the intermediate layer(s) or the substrate. The photoresist is selectively removed from exposed regions (step 440), and then mask material (and any other layers on top of the mask material) is selectively removed from these areas (step 450). In step 460, the remaining photoresist is removed to leave behind the mask material and selectively exposed portions of the substrate. These exposed portions may be of any shape, including, for example, circular; moreover, they may be disposed in a regular pattern corresponding to a desired shape and size of an array of crystals to be grown. In some embodiments, the exposed portions are in a size range from about 0.3 micrometers to about 0.7 micrometers.

As described above the shape of the crystal 50 (FIG. 1) in part determines what wavelength(s) of radiation will be emitted. It is well known in the art that certain crystal growth parameters used in the growth process will affect the faceting, and hence the shape, of the resultant crystals. Key parameters include temperature, precursor flow rates, pressure, and growth time. Moreover, the selection of the substrate in an epitaxial growth process is known to affect faceting during crystal growth due to strains associated with lattice mismatch between the substrate and the crystal materials. For example, gallium nitride crystals grown with no or low mismatch strain have been shown to exhibit pyramidal morphologies, while highly strained crystals show prismatic shapes. Those skilled in the art will appreciate that the shape of the crystals may be controlled to provide the desired optical properties required for embodiments of the present invention.

Figure 5:
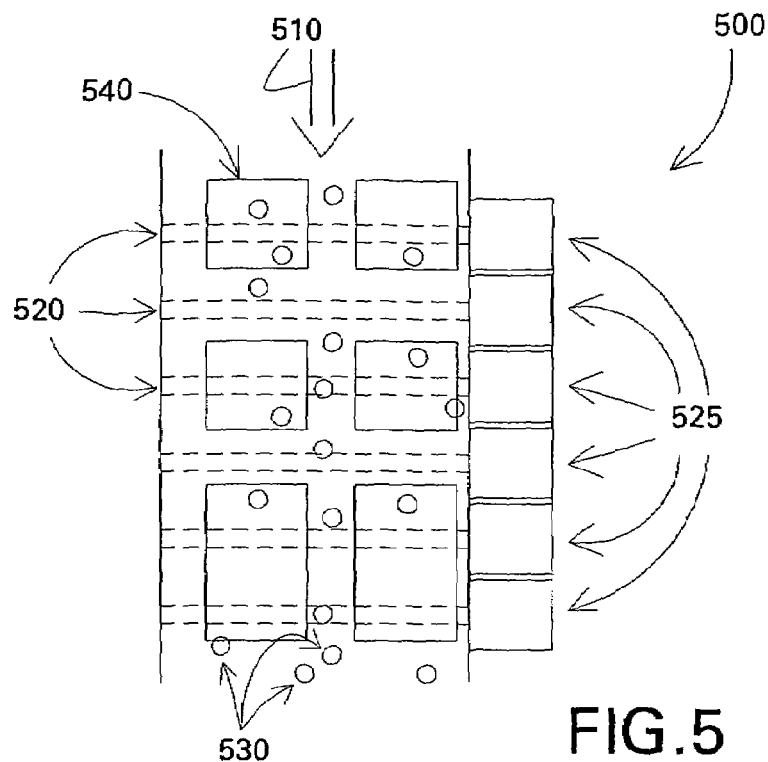
FIG. 5 is a schematic representation of a fluorescence detector in accordance with embodiments of the present invention.

Device 10 (FIG. 1) is suitable for incorporation into a laser assembly. Accordingly, embodiments of the present invention include a laser assembly comprising device 10. Laser assemblies are useful in a number of applications. The capabilities of the device 10 lend themselves, for instance, to embodiments in which the laser assembly comprising device 10 is a component of an optical detection system, wherein the radiation from the device 10 is impinged upon a sample to detect the presence of or properties of certain substances. In certain embodiments, the detection system includes a detection module for detecting reaction products produced by the interaction of the sample with the beam of radiation emitted by device 10. In some embodiments, these reaction products include radiation emitted via fluorescence or other mechanism, chemical products, or other emission from the sample. For instance, in an exemplary aerosol fluorescence detector 500, such as a bioaerosol fluorescence detector, a non-limiting example of which is depicted in part in FIG. 5, an atmospheric sample 510 is directed through an array of laser beams 520 generated by multiple laser assemblies 525, each assembly 525 comprising a device of the present invention. The wavelength(s) of the laser beams 520, generally in the UV or blue range, is selected to cause fluorescence in particulates 530, entrained in the sample, that contain certain chemical or biological species. This fluorescence is detected, for instance, by an array of photodiodes 540 or other light detector, and where fluorescence is detected, an alarm can be activated. At the same time, particulate sizing and velocity information may be derived using known laser-based techniques such as Aerodynamic Particle Sizing (APS) or High Volume Aerodynamic Particle Sizing (HVAPS). Detectors such as the type described herein are useful in security applications, as in security checkpoint inspections of people, luggage, etc.

Figure 6:
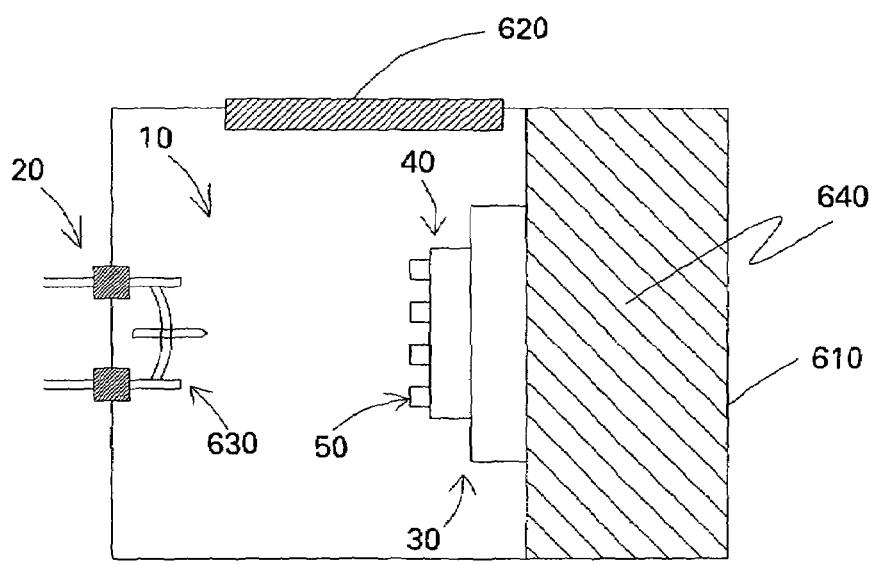
FIG. 6 is a schematic of a laser assembly in accordance with embodiments of the present invention.

One exemplary embodiment of a laser assembly 600 in accordance with embodiments of the present invention is depicted in FIG. 6. Device 10 of the present invention is disposed within a chamber 610. Chamber 610 comprises a window 620 that is substantially transparent (i.e., transmitting at least about 50% of the incident radiation) to electromagnetic radiation having a wavelength in the range emitted by device 10. In particular embodiments this wavelength is in the range from about 50 nanometers to about 10 micrometers. Chamber 610 is configured to maintain a partial vacuum. Device 10, as described previously, includes source 20 of atomic particles, and collector 30, comprising emission medium 40, disposed to receive atomic particles from source 20. Device 10 is configured to emit laser radiation through window 620. In particular embodiments, the laser radiation has a wavelength in the range from about 50 nanometers to about 10 micrometers. In particular embodiments, source 20 is a cathode 630 disposed at the wall of chamber 610 via any of various feedthrough components known to those in the art. Cathode 630 is electrically connected to a power source (not shown) and serves as a source of electrons to be impinged upon collector (anode) 30. As is known in the art, a biased grid or magnet (not shown) may be used to focus, direct, disperse, amplify, retard, speed-up, redirect, or terminate the flow of electrons to collector 30. Grid bias is typically on the order of the electron beam potential (1-10 kV). An electromagnet (not shown) may be used to electromagnetically control the position of the electron beam (through the Lorentz Force, F~v×B) such that multiple crystals 50 or groups of crystals 50 having different emission wavelengths can be excited upon command, yielding a controllable and selectable multiwavelength emission source. For example, a collector 30 may comprise a plurality of crystals 50, where the plurality of crystals 50 comprises multiple subsets of crystals 50, each subset comprising crystals 50 having an emission wavelength range unique to that subset. The electron beam can be steered electromagnetically as described above to impinge upon one or more of the subsets, or all of the subsets, depending on the desired mix of wavelengths to be emitted by device 10.

Collector 30 optionally includes a heat sink 640 in thermal communication with collector 30, in order to maintain temperature of collector 30 within operational limits. Collector 30 may also be electrically connected to the same power source (not shown) as is cathode 630, such that an electric field is generated between source 20 and collector 30. Emission medium 40 is a lasing medium 650 (i.e., capable of producing stimulated emission) in certain embodiments, and in particular embodiments comprises a plurality of crystals 50. Each crystal 50 has facets that define an optical resonator; in some embodiments the resonator has a dimension in the range from about 10 nanometers to about 50 micrometers. In particular embodiments, at least one crystal comprises a material having the formula $Al_xIn_yGa_{(1-x-y)}N$; where the sum x+y is less than or equal to 1.

In certain embodiments, a secondary optical resonator is disposed external to the crystals 50, which themselves serve as resonators as explained above. A partially reflective mirror (not shown) disposed between device 10 and window 620 allows reflection of laser radiation emitted by crystals 50, providing optical feedback for enhanced laser radiation emission. The degree of reflectivity of the mirror is determined by the desired amount of radiation to be transmitted to window 620. In certain embodiments, the mirror reflects from about 30% to about 90% of incident radiation.

In some embodiments the assembly 600 further comprises a filter (not shown) disposed between device 10 and window 620. The filter allows the laser radiation passing out of the window to be precisely selected for those applications where only a narrow band of wavelengths is desirable. In certain embodiments, moreover, window 620 itself serves as a filter, allowing only a narrow range of wavelengths to pass through.

Assembly 600 is suitable for use in any of a number of useful laser-based applications, including detectors such as the bioaerosol fluorescence detector described previously.

EXAMPLE

The following example is presented to further describe embodiments of the present invention, and should not be understood to limit the invention in any way.

A device in accordance with embodiments of the present invention was fabricated by disposing an emission medium onto an anode of a scanning electron microscope (SEM), and the device was operated by using the microscope cathode as a source of electrons to pump the medium. The emission medium comprised a 1 millimeter by 1 millimeter planar array of gallium nitride crystals epitaxially grown on an aluminum nitride support layer disposed on a sapphire substrate. The crystals were hexagonal prisms (sometimes referred to as "hexagonal pyramids" in the art) having a nominal base size of about 700 nanometers, and the array had a nominal intercrystalline spacing of about 700 nanometers. The medium was electrically connected to the grounded anode plate by a copper conductor. A fiber optic probe connected to a spectrometer monitored emission from the medium as electrons from the SEM cathode impinged upon the medium. The energy of the electrons was controlled by controlling the accelerating voltage of the SEM.

Figure 7:
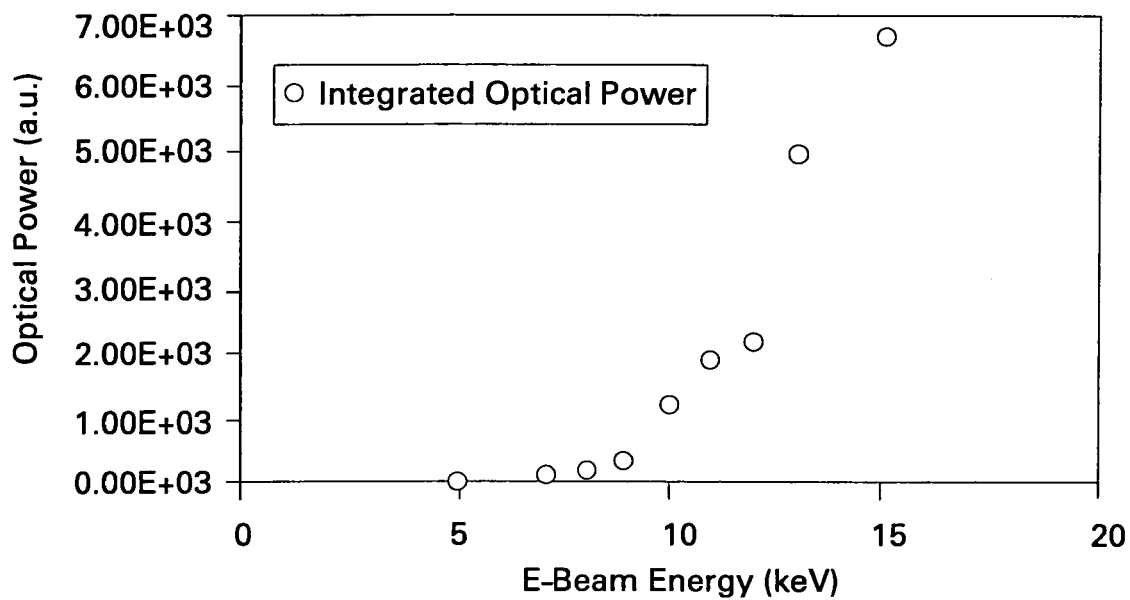
FIG. 7 is a plot showing performance of an exemplary embodiment of the present invention.

FIG. 7 illustrates the results of this operation. Integrated optical power showed a characteristic "thresholding" effect when electron energy increased above about 10 kiloelectronvolts (keV). This effect is commonly known to be indicative of stimulated emission. Moreover, the emitted radiation appeared to have a much more narrow wavelength distribution (1-10 nanometer full width at half maximum intensity (FWHM)) than is typically measured for gallium nitride luminescence (20-30 nanometers), further evidence of the presence of a significant amount of stimulated emission.

While various embodiments are described herein, it will be appreciated from the specification that various combinations of elements, variations, equivalents, or improvements therein may be made by those skilled in the art, and are still within the scope of the invention as defined in the appended claims.

What is claimed is:

1. A device for emission of electromagnetic radiation, comprising:
    a source of atomic particles; and
    a collector disposed to receive atomic particles from the source across a gap, the collector comprising an emission medium, the medium comprising a crystal having a spatial dimension in the range from about 10 nanometers to about 50 micrometers,
    wherein the emission medium has the capability to generate opposing charge pairs upon absorption of atomic particles from the source and to emit electromagnetic radiation upon recombination of the pairs,
    wherein the emission medium comprises a plurality of crystals, wherein each crystal has a spatial dimension in the range from about 10 nanometers to about 50 micrometers,
    wherein the plurality comprises an array of the crystals, wherein the array is disposed such that substantially all of the crystals in the array share a common plane,
    wherein the array is an ordered array having an intercrystal spacing that is a multiple of the radius of gyration of the crystal area projected onto the common plane, the multiple in the range from about 0.5 to about 10.

2. The device of claim 1, wherein the emission medium is a medium capable of producing stimulated emission.

3. The device of claim 2, wherein the crystal comprises facets that define an optical resonator having a dimension in the range from about 10 nanometers to about 50 micrometers.

4. The device of claim 3, wherein the facets defining the optical resonator have a roughness of less than about 10 nanometers.

5. The device of claim 3, wherein the crystal is an epitaxially grown crystal.

6. The device of claim 1, wherein the crystal comprises material having a crystal lattice structure selected from the group consisting of hexagonal close packed, cubic, face centered cubic, body centered cubic, diamond cubic, wurtzite structure, and zincblende structure.

7. The device of claim 1, wherein the crystal comprises a semiconductor material.

8. The device of claim 7, wherein the material comprises a direct bandgap semiconductor.

9. The device of claim 8, wherein the semiconductor is a III-V semiconductor.

10. The device of claim 7, wherein the semiconductor comprises a material selected from the group consisting of nitrides, arsenides, phosphides, tellurides, and antimides.

11. The device of claim 10, wherein the nitride is a material having the formula $$Al_xIn_yGa_{(1-x-y)}N;$$

where the sum x+y is less than or equal to 1.

12. The device of claim 1, wherein the emission medium further comprises a potential well disposed within or upon the crystal.

13. The device of claim 1, wherein the crystal comprises doped material.

14. The device of claim 1, wherein the crystal comprises a luminescent material selected from the group consisting of a scintillator material and a phosphor material.

15. The device of claim 1, wherein the capability to emit electromagnetic radiation is the capability to emit electromagnetic radiation having a wavelength in a wavelength range from about 50 nanometers to about 10 micrometers.

16. The device of claim 15, wherein the wavelength range is from about 100 nanometers to about 5 micrometers.

17. The device of claim 16, wherein the wavelength range is from about 150 nanometers to about 3 micrometers.

18. The device of claim 1, wherein the plurality of crystals comprises crystals having substantially identical composition, size, and shape.

19. The device of claim 1, wherein the emission medium has the capability to emit electromagnetic radiation having a plurality of wavelengths.

20. The device of claim 19, wherein at least one crystal of the plurality substantially differs from another crystal of the plurality in at least one characteristic selected from the group consisting of size, shape, crystal structure, and chemical composition.

21. The device of claim 1, wherein the source of atomic particles is a source of at least one type of atomic particle selected from the group consisting of protons, electrons, neutrons, and alpha particles.

22. The device of claim 21, wherein the source is a source of electrons, and the collector is an anode.

23. The device of claim 22, wherein the source of electrons comprises at least one selected from the group consisting of a wire-wound filament emitter, a field emitter, a dispenser cathode, a photo-emitter, and a ferroelectric cathode.

24. The device of claim 22, further comprising at least one beam control component selected from the group consisting of an electrically biased grid and an electromagnet, the beam control component disposed between the cathode and the anode.

25. The device of claim 1, wherein the collector comprises an emission assembly, said assembly comprising the emission medium and a substrate upon which the emission medium is disposed.

26. The device of claim 25, wherein the substrate comprises an electrically insulating material.

27. The device of claim 26, wherein the insulating material comprises a material selected from the group consisting of sapphire, quartz, SiO2, silicon nitride, aluminum nitride, and an oxide material.

28. The device of claim 25, wherein the substrate comprises an electrically semiconductive or electrically conductive material.

29. The device of claim 28, wherein substrate comprises silicon.

30. The device of claim 25, wherein the emission assembly further comprises an intermediate layer of material disposed between the substrate and the emission medium.

31. The device of claim 30, wherein the intermediate layer comprises a material selected from the group consisting of aluminum nitride, gallium nitride, indium nitride, aluminum indium gallium nitride, silicon, zinc oxide, gallium arsenide, aluminum indium gallium arsenide, lithium gallate, and boron nitride.

32. A laser assembly comprising the device of claim 1.

33. An optical detection system comprising the device of claim 1.

34. A bioaerosol fluorescence detector comprising the device of claim 1.

35. A laser assembly, comprising:
a chamber comprising a window substantially transparent to electromagnetic radiation having a wavelength in the range from about 50 nanometers to about 10 micrometers, the chamber configured to contain a partial vacuum; and
a laser emission device disposed within the chamber and configured to emit laser radiation though the window, the laser radiation having a wavelength in the range from about 50 nanometers to about 10 micrometers, the laser emission device comprising
a cathode; and
an anode disposed to receive electrons from the cathode across a gap, the anode comprising a lasing medium;
wherein the lasing medium comprises a plurality of crystals, each crystal having facets that define an optical resonator having a dimension in the range from about 10 nanometers to about 50 micrometers, wherein the lasing medium has the capability to emit electromagnetic radiation having a plurality of wavelengths, and
wherein at least one crystal comprises a material having the formula $$Al_xIn_yGa_{(1-x-y)}N;$$

where the sum x+y is less than or equal to 1.

36. The laser assembly of claim 35, wherein the laser assembly is a component of a bioaerosol fluorescence detector.

37. The laser assembly of claim 35, wherein the laser assembly further comprises a partially reflective mirror disposed between the laser emission device and the window.

38. The laser assembly of claim 35, wherein the laser assembly further comprises a filter disposed between the laser emission device and the window.

39. A method for making a device for emission of electromagnetic radiation, the method comprising:
providing a source of atomic particles;
providing a collector comprising an emission medium, the medium comprising a crystal having a spatial dimension in the range from about 10 nanometers to about 50 micrometers, wherein the emission medium has the capability to generate opposing charge pairs upon absorption of atomic particles from the source and to emit electromagnetic radiation upon recombination of the pairs, wherein the emission medium has the capability to emit electromagnetic radiation having a plurality of wavelengths; and
disposing the collector to receive atomic particles from the source across a gap.

40. The method of claim 39, wherein providing the collector comprises epitaxially growing the crystal on a substrate.

41. The method of claim 40, wherein epitaxially growing the crystal comprises
   providing the substrate;
   rendering selected portions of the substrate unavailable for crystal growth in a crystal growth process; and
   exposing the substrate to the crystal growth process.

42. The method of claim 41, wherein the crystal growth process comprises metallorganic chemical vapor deposition.

43. The method of claim 41, wherein rendering comprises masking the substrate with a patterned template.

44. A device for emission of electromagnetic radiation, comprising:
   a source of atomic particles; and
   a collector disposed to receive atomic particles from the source across a gap, the collector comprising an emission medium, the medium comprising a crystal having a spatial dimension in the range from about 10 nanometers to about 50 micrometers,
   wherein the emission medium has the capability to generate opposing charge pairs upon absorption of atomic particles from the source and to emit electromagnetic radiation upon recombination of the pairs,
   wherein the emission medium comprises a plurality of crystals, wherein each crystal has a spatial dimension in the range from about 10 nanometers to about 50 micrometers,
   wherein the emission medium has the capability to emit electromagnetic radiation having a plurality of wavelengths.

45. The device in claim 44, wherein at least one crystal of the plurality substantially differs from another crystal of the plurality in at least one characteristic selected from the group consisting of size, shape, crystal structure, and chemical composition.

* * * * *

UNITED STATES PATENT AND TRADEMARK OFFICE
CERTIFICATE OF CORRECTION

PATENT NO. : 7,580,440 B2　　　　　　　　　　　　　　　　　　　　　　　Page 1 of 1
APPLICATION NO. : 11/260415
DATED : August 25, 2009
INVENTOR(S) : LeBoeuf et al.

It is certified that error appears in the above-identified patent and that said Letters Patent is hereby corrected as shown below:

In Column 5, Line 16, delete "(AIN)," and insert -- (AlN), --, therefor.

In Column 12, Line 24, in Claim 35, delete "though" and insert -- through --, therefor.

Signed and Sealed this

Sixteenth Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,580,440 B2  Page 1 of 1
APPLICATION NO. : 11/260415
DATED : August 25, 2009
INVENTOR(S) : LeBoeuf et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 829 days.

Signed and Sealed this

Fourteenth Day of September, 2010

David J. Kappos
*Director of the United States Patent and Trademark Office*